United States Patent
Xu et al.

(10) Patent No.: US 12,353,690 B2
(45) Date of Patent: Jul. 8, 2025

(54) MULTIMEDIA INFORMATION DISPLAY METHOD AND APPARATUS, ELECTRONIC DEVICE, AND STORAGE MEDIUM

(71) Applicants: Beijing Zitiao Network Technology Co., Ltd., Beijing (CN); BEIJING YOUZHUJU NETWORK TECHNOLOGY CO., LTD., Beijing (CN)

(72) Inventors: Han Xu, Beijing (CN); Xiaolei Shi, Beijing (CN); Zhixiong Liu, Beijing (CN); Jia Liu, Beijing (CN); Yuanyu Gao, Beijing (CN); Jialong Zhao, Beijing (CN); Shuai Niu, Beijing (CN); Weizun Zhang, Beijing (CN); Huaxin Wang, Beijing (CN); Mingdi Cen, Beijing (CN); Boqi Zhang, Beijing (CN); Liming Tang, Beijing (CN); Jingjing Lu, Beijing (CN); Bo Yang, Beijing (CN); Wen Luo, Beijing (CN); Shixiong Suo, Beijing (CN); Jun Yuan, Beijing (CN); Pengfei Ji, Beijing (CN)

(73) Assignees: BBEIJING ZITIAO NETWORK TECHNOLOGY CO., LTD., Beijing (CN); BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 18/087,621

(22) Filed: Dec. 22, 2022

(65) Prior Publication Data
US 2023/0128553 A1    Apr. 27, 2023

Related U.S. Application Data

(63) Continuation of application No. PCT/CN2021/115739, filed on Aug. 31, 2021.

(30) Foreign Application Priority Data

Sep. 8, 2020    (CN) .......................... 202010937503.7

(51) Int. Cl.
  *G06F 3/0484*    (2022.01)
  *G06F 3/04842*   (2022.01)
  (Continued)

(52) U.S. Cl.
  CPC ........ *G06F 3/04842* (2013.01); *G06F 3/0488* (2013.01); *G06Q 30/0257* (2013.01); *G06T 11/60* (2013.01); *G06T 2200/24* (2013.01)

(58) Field of Classification Search
  CPC .... G06F 3/04842; G06F 3/0488; G06T 11/60; G06T 2200/24; G06Q 30/0257
  See application file for complete search history.

(56) References Cited

U.S. PATENT DOCUMENTS 9,386,328 B1 *   7/2016  Crane ................. H04N 21/858
11,051,067 B1 *  6/2021  Baxter ............... G06Q 30/0641
(Continued)

FOREIGN PATENT DOCUMENTS

CN    103618959 A    3/2014
CN    107872731 A    4/2018
(Continued)

OTHER PUBLICATIONS

ISA China Patent Office, International Search Report issued in Application No. PCT/CN2021/115739, Nov. 30, 2021, WIPO, 10 pages.
(Continued)

*Primary Examiner* — Mandrita Brahmachari
(74) *Attorney, Agent, or Firm* — Alleman Hall & Tuttle LLP

(57) ABSTRACT

A multimedia information display method is provided. The method includes: obtaining to-be-displayed multimedia
(Continued)

information, where the to-be-displayed multimedia information includes main multimedia information and at least one piece of additional multimedia information having an association relationship; displaying the main multimedia information on a display interface; determining a cover for the at least one piece of additional multimedia information when the main multimedia information is displayed for a preset time period, and displaying the main multimedia information and the cover on the display interface; and switching, in response to a clicking operation on the cover, the main multimedia information displayed on the display interface into the additional multimedia information corresponding to the clicking operation.

16 Claims, 8 Drawing Sheets

(51) Int. Cl.
    *G06F 3/0488*      (2022.01)
    *G06Q 30/0251*      (2023.01)
    *G06T 11/60*      (2006.01)

(56) References Cited

U.S. PATENT DOCUMENTS

| | | | |
|---|---|---|---|
| 2006/0257048 A1* | 11/2006 | Lin | G06V 20/40 382/276 |
| 2008/0072132 A1 | 3/2008 | Moraveji et al. | |
| 2009/0097748 A1 | 4/2009 | Lee et al. | |
| 2009/0150786 A1 | 6/2009 | Brown | |
| 2011/0131094 A1* | 6/2011 | Chuang | G06Q 30/0264 715/776 |
| 2011/0176788 A1* | 7/2011 | Bliss | G11B 27/34 386/E5.003 |
| 2015/0301693 A1 | 10/2015 | Wheeler et al. | |
| 2016/0066059 A1* | 3/2016 | Iwanami | H04N 21/4722 725/32 |
| 2016/0239198 A1* | 8/2016 | Shenkler | H04N 21/4316 |
| 2019/0073106 A1* | 3/2019 | Zhou | G06F 3/04883 |
| 2023/0300425 A1* | 9/2023 | Park | H04N 21/4316 725/32 |

FOREIGN PATENT DOCUMENTS

| | | |
|---|---|---|
| CN | 110149558 A | 8/2019 |
| CN | 111327940 A | 6/2020 |
| CN | 112016978 A | 12/2020 |
| JP | 2019029871 A | 2/2019 |
| JP | 2020074178 A | 5/2020 |
| JP | 6741310 B | 8/2020 |
| WO | 2014171281 A1 | 10/2014 |

OTHER PUBLICATIONS

European Patent Office, Extended European Search Report Issued in Application No. 21865894.6, Oct. 9, 2023, Germany, 9 pages.
Japan Patent Office, Office Action Issued in Application No. 2023-514708, Aug. 27, 2024, 9 pages.
ISA China National Intellectual Property Administration, Written Opinion for International Application No. PCT/CN2021/115739, mailed Nov. 30, 2021, 9 pages.
Chen, Y. et al., Network Marketing, Chongqing University Press, Feb. 28, 2018, relevant pp. 172-181, total pp. 22.
China National Intellectual Property Administration, Office Action Issued in Application No. 202010937503.7, Mar. 8, 2024, 38 pages.
Song, P. Theory and Practice of Network Marketing, Xidian University Press, Sep. 2010, relevant pp. 162-164, total pp. 15.
Japan Patent Office, Office Action Issued in Application No. 2023-514708, Feb. 20, 2024, 8 pages.
Notice of Reasons for Refusal for Japanese Application No. 2023-514708, mailed Feb. 25, 2025, 7 pages.

* cited by examiner

MULTIMEDIA INFORMATION DISPLAY METHOD AND APPARATUS, ELECTRONIC DEVICE, AND STORAGE MEDIUM

CROSS REFERENCE OF RELATED APPLICATION

The present application is continuation application of PCT international patent application PCT/CN2021/115739, filed on Aug. 31, 2021 which claims the priority to Chinese Patent Application No. 202010937503.7, titled "MULTIMEDIA INFORMATION DISPLAY METHOD AND APPARATUS, ELECTRONIC DEVICE AND STORAGE MEDIUM", filed on Sep. 8, 2020 with the State Intellectual Property Office of the PRC, both of which are incorporated herein by reference in their entireties.

FIELD

The present disclosure relates to the technical field of data processing, and in particular to a multimedia information display method and apparatus, an electronic device and a storage medium.

BACKGROUND

With development of the short video technology, the advertisers increasingly intend to promote advertisements through the short videos.

In the existing advertisement promotion process performed by a short video, the advertiser generally sets a playing duration for the multimedia information as a common duration of the short video in advance, for example about 10 to 15 seconds. Since the playing duration is short, the audience is not deeply impressed by the advertisement, thereby limiting promotion of the advertisement. In some cases, the length of the advertisement materials cannot be compressed into a short one, thus the advertisement materials are required to be divided into multiple short video advertisements. The short video advertisement is played according to an insertion playing mechanism. In this case, the multimedia information is played between two short videos which are not advertisements. If short videos of multiple pieces of multimedia information are inserted and played, the audience can view the non-advertisement content until all multimedia information is played, resulting in a bad experience.

SUMMARY

A multimedia information display method and apparatus, an electronic device and a storage medium are provided according to embodiments of the present disclosure, to solve the above technical problem or at least partially solve the above technical problem.

In a first aspect, a multimedia information display method is provided. The method includes: obtaining to-be-displayed multimedia information, where the to-be-displayed multimedia information includes main multimedia information and at least one piece of additional multimedia information having an association relationship; displaying the main multimedia information on a display interface; determining a cover for the at least one piece of additional multimedia information when the main multimedia information is displayed for a preset time period, and displaying the main multimedia information and the cover on the display interface; and switching, in response a clicking operation on the cover, the main multimedia information displayed on the display interface into the additional multimedia information corresponding to the clicking operation.

In a second aspect, a multimedia information display apparatus is provided. The apparatus includes: a material packet obtaining module, configured to obtain to-be-displayed multimedia information, where the to-be-displayed multimedia information includes main multimedia information and at least one piece of additional multimedia information having an association relationship; a main material display module, configured to display the main multimedia information on a display interface; a display module, configured to determine a cover for the at least one piece of additional multimedia information when the main multimedia information is displayed for a preset time period, and display the main multimedia information and the cover on the display interface; and a first switching module, configured to switch, in response a clicking operation on the cover, the main multimedia information displayed on the display interface into the additional multimedia information corresponding to the clicking operation.

In a third aspect, an electronic device is provided according to embodiments of the present disclosure. The electronic device includes a memory, a processor and computer programs stored in the memory and executable in the processor. The processor executes the programs to implement the method according to the first aspect.

In a fourth aspect, a computer readable storage medium storing computer programs is provided according to embodiments of the present disclosure. The computer programs are executed by a processor to implement the method according to the first aspect.

According to the multimedia information display method and apparatus, the electronic device and the storage medium provided in the embodiments of the present disclosure, the to-be-displayed multimedia information including the main multimedia information and the additional multimedia information is received. When the main multimedia information is displayed for a preset time period, the cover for the additional multimedia information is displayed. In this way, a user can see the additional multimedia information by clicking the cover, thereby displaying multiple pieces of multimedia information in an association manner. When the multimedia information is an advertisement, the user can determine whether to view only a short video advertisement (that is, the main multimedia information) or further view other associated short video advertisement (that is, the additional multimedia information). In this way, the user can view the advertisement more flexibly. Both the main multimedia information and the cover for the additional multimedia information are displayed, so that the user can know the associated short video advertisement even if the user views only one short video advertisement. While in the prior art, multiple short video advertisements are pushed for one time, resulting in that the user can know the entire advertisements only if the user views all short video advertisements. In addition, according to the present disclosure, the additional multimedia information is displayed in response to clicking the cover by the user, and is not enforced to be displayed, thereby pushing the advertisements more friendly and facilitating deep knowing of the multimedia information by the user.

BRIEF DESCRIPTION OF THE DRAWINGS

In order to illustrate the technical solutions in embodiments of the present disclosure clearer, drawings to be used in the description of the embodiments of the present disclosure are introduced simply hereinafter.

DETAILED DESCRIPTION OF EMBODIMENTS

Figure 1:
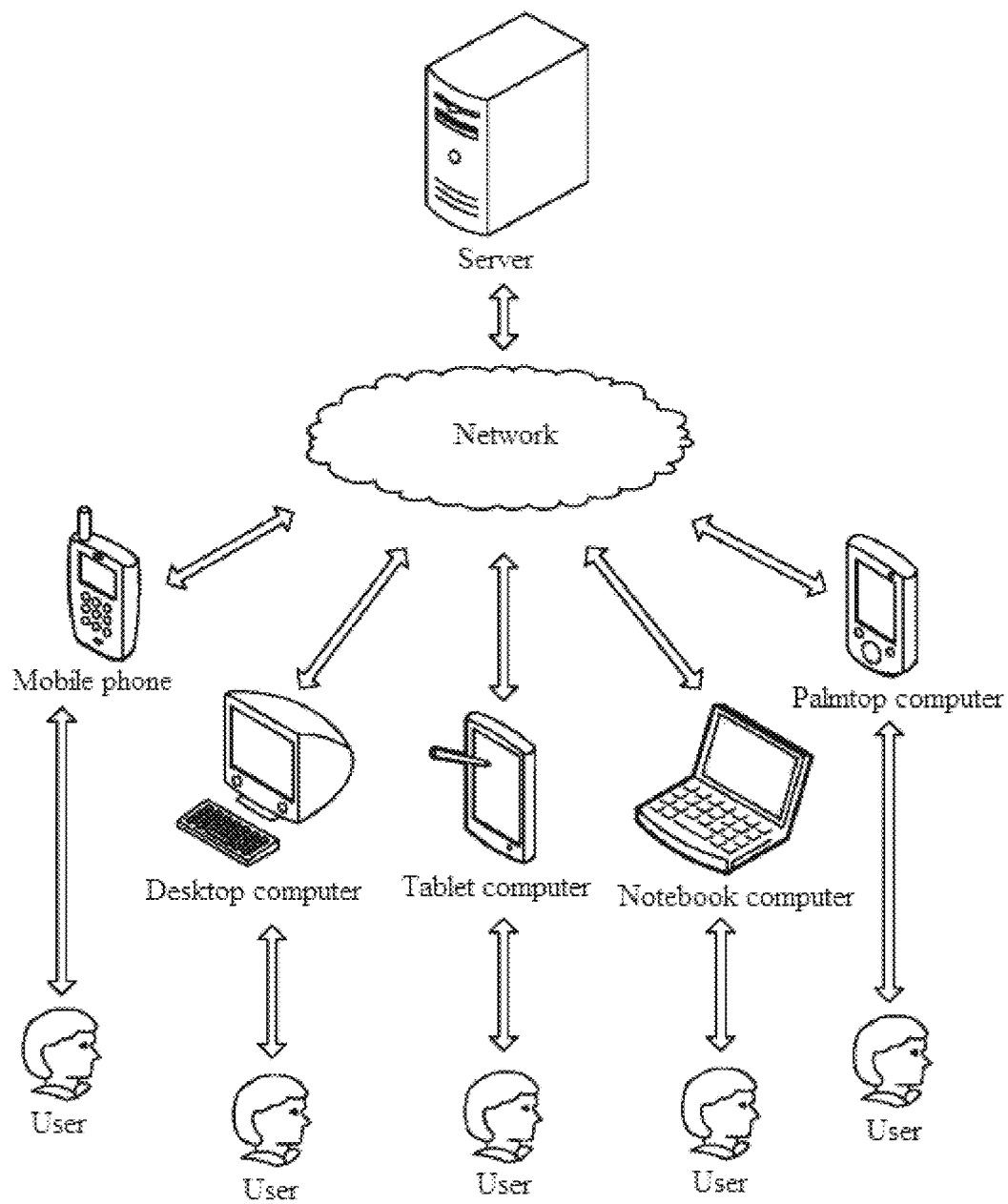
FIG. 1 is a diagram showing an architecture of a network over which a multimedia information display system operates according to an embodiment of the present disclosure.

Embodiments of the present disclosure are described in detail hereinafter. Examples of the embodiments are shown in the drawings. Throughout the drawings, the same or similar reference numerals indicate the same or similar elements or elements having the same or similar function. Embodiments described below with reference to the drawings are schematic, and are used to illustrate the present disclosure rather than restrict the present disclosure.

It should be understood by those skilled in the art that, the term "one" and "this" used herein may indicate multiple, unless explicitly indicated. It should be understood that, the term "include" used in the specification of the present disclosure indicates existing of features, integers, steps, operations, elements and/or components, but it does not exclude existing or adding of one or more other features, integers, steps, operations, elements, components and/or combinations thereof. It should be understood that, when an element is connected or coupled to another element, the element may be connected or coupled directly to another element or connected to another element via an intermediate element. The "connected" or "coupled" used herein includes wireless connection or wireless coupling. The term "and/or" used herein includes all or any of one or more associated items and any combinations.

The technical solutions of the present disclosure are described in detail by embodiments. Several embodiments described below may be combined with each other, and the same or similar concept may be not described in certain embodiments. The embodiments of the present disclosure are described in detail below in conjunction with the drawings.

First, the present disclosure may be applied to a scenario in which multiple pieces of multimedia information having an association relationship is to be played, for example, an advertisement playing scenario and series short video playing scenario. The multiple pieces of multimedia information indicates two or more pieces of multimedia information published by a publisher of the multimedia information in a same playing scenario. The multimedia information may be a picture, a music, a video or a word. The association relationship means that different multimedia information is associated with each other in vision and content via one or more series elements. In an advertisement scenario, the multiple pieces of multimedia information may be videos of displaying stature at an early stage, intermediate state and late stage when a user takes weight-reducing medicine. In a series short video playing scenario, the multiple pieces of multimedia information may be showing videos of an actor in the morning, noon and evening of a day. The multiple pieces of multimedia information generally has a time sequence. The main multimedia information may be first multimedia information, multimedia information which attracts audiences most, or a summary of all the multimedia information. Forms of the main multimedia information are not limited herein.

It should be understood that, the multimedia information display method provided in the present disclosure may be applied to a computer device program running process or a multimedia information display system or process containing advertisements, for example an advertisement pushing program. The multimedia information display system may operate in the network architecture shown in FIG. 1. FIG. 1 shows the network architecture for operating of the multimedia information display system. As shown in FIG. 1, the multimedia information display system may display multimedia information from multiple information sources. A terminal receives to-be-displayed multimedia information issued by a server, and displays main multimedia information on a display interface. When the main multimedia information is displayed for a preset time period, a cover for at least one piece of additional multimedia information is determined. The main multimedia information and the cover are displayed on the display interface. In response to a clicking operation on the cover, the main multimedia information displayed on the display interface is switched into the additional multimedia information corresponding to the clicking operation. It should be understood that, FIG. 1 shows multiple computer devices, and more or less types of computer devices may perform the multimedia content display in an actual scenario. The number and type of the computer device depends on the actual scenario and is not limited herein. In addition, FIG. 1 shows one server, and more servers may be provided in the actual scenario, particular in a multiple application data interaction scenario. The number of server depends on the actual scenario.

It should be noted that, the multimedia information display method in the embodiment may be performed off-line, that is, without the server. In this case, the terminal processes the to-be-displayed multimedia information stored locally and pushes the information to a specified display interface.

In order to illustrate the technical solution of the present disclosure clearer, it is assumed that the present disclosure is applied to the advertisement pushing scenario in the following description. In the existing advertisement promotion process performed by a short video, an advertiser generally sets a playing duration for the multimedia information as a common duration of the short video in advance, for example about 10 to 15 seconds. Since the playing duration is short, the audience is not deeply impressed by the advertisement, thereby limiting promotion of the advertisement. In some cases, the length of the advertisement cannot be compressed into a short one, thus the multimedia information is required to be divided into multiple sub videos. The advertisement of the short video is played according to an insertion playing mechanism. In this case, the multimedia information is played between two short videos which are not advertisements. If multiple pieces of multimedia information are inserted and played, the audience can view the non-advertisement content until all multimedia information is played, resulting in a bad experience.

Figure 2:
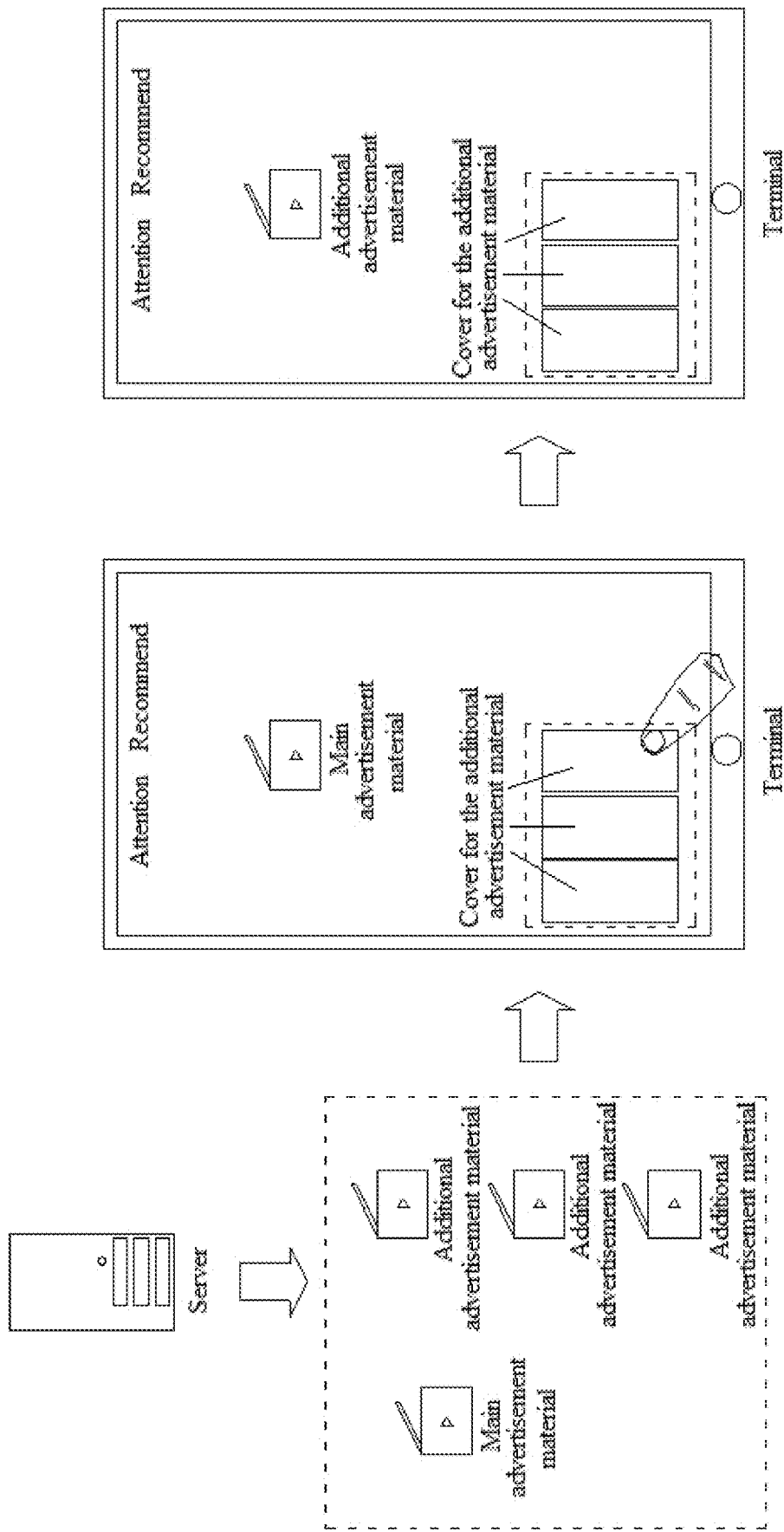
FIG. 2 is a diagram showing an architecture of flow of multimedia information display according to an embodiment of the present disclosure.

In order to solve the above technical problem, a multimedia information display method is provided according to the present disclosure. The method is applied to a flow framework of the multimedia information display shown in FIG. 2 and is performed by a computer device which may be a terminal. FIG. 2 shows a flow architecture of multimedia information display according to an embodiment of the present disclosure. First, a server issues to-be-displayed multimedia information. The to-be-displayed multimedia information includes main multimedia information (main advertisement material shown in FIG. 2) and at least one piece of additional multimedia information (additional advertisement materials shown in FIG. 2) having an association relationship, for example, a picture, a video or a combination thereof. Then, a terminal displays the main multimedia information on a display interface; determines a cover for the at least one piece of additional multimedia information when the main multimedia information is displayed for a preset time period; and displays the main multimedia information and the cover on the display interface. The terminal switches, in response to a clicking operation on the cover by the user, the main multimedia information displayed on the display interface into the additional multimedia information corresponding to the clicking operation.

It should be understood that, the multimedia information display system may operate in a personal mobile terminal, for example an advertisement pushing plug-in, may operate in a server or may operate as a third-party device to display the multimedia information, so as to obtain a multimedia information display result. For example, the mobile terminal starts to play related short videos, pulls to-be-displayed multimedia information through programs to display main multimedia information, and then switches to display the additional multimedia information in response to triggering. The multimedia information display may operate in the above device as a program, may operate as a system component in the above device, or may operate as a cloud-end service program. Operation manners depend on the actual scenario and are not limited herein.

Figure 3:
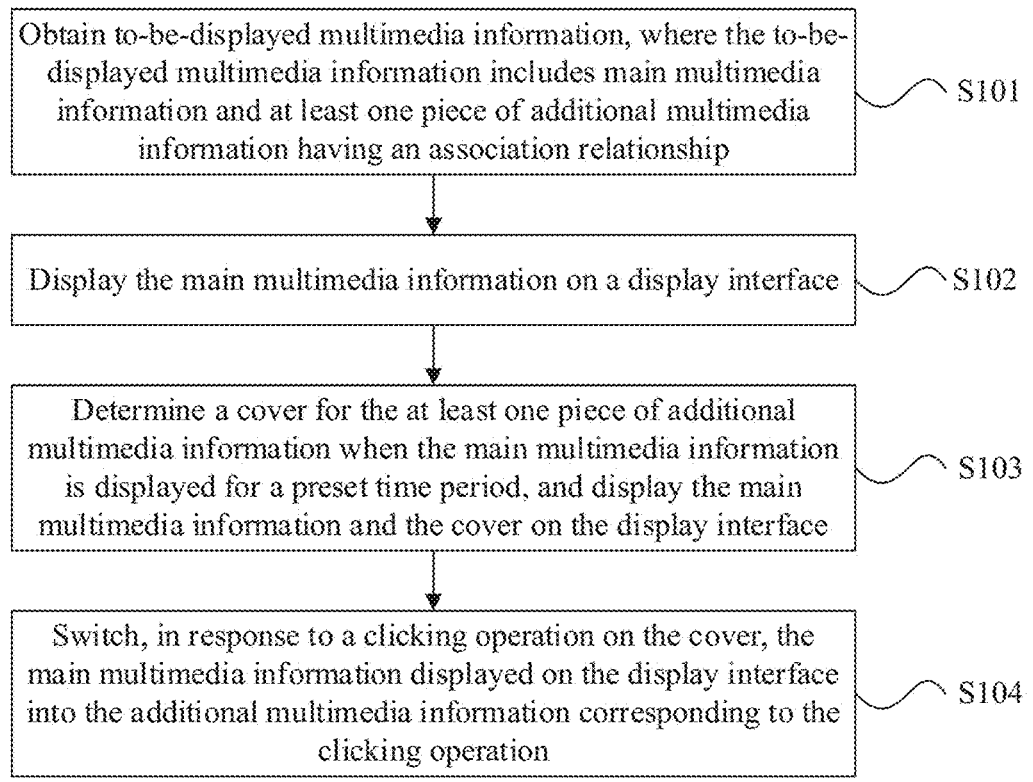
FIG. 3 is a flowchart of a multimedia information display method according to an embodiment of the present disclosure.

The multimedia information display method according to the present disclosure is described below in conjunction with the above flow architecture. FIG. 3 shows a flowchart of a multimedia information display method according to an embodiment of the present disclosure. The method includes steps S101 to S104 as follows.

In step S101, to-be-displayed multimedia information is obtained. The to-be-displayed multimedia information includes main multimedia information and at least one piece of additional multimedia information having an association relationship.

The to-be-displayed multimedia information in the embodiment may be sent by a server or may be stored locally by a terminal. The multimedia information may be a picture, a word, a music, a video or an interface of executable program. The multimedia information may be pushed to a related interface of the terminal for playing and displaying, and specific displaying forms depend on the actual scenario.

Multimedia information in the to-be-displayed multimedia information has an association relationship. The association relationship indicates that different multimedia information is associated with each other in vision and content through one or more series connection element. For example, the to-be-displayed multimedia information includes multiple pieces of multimedia information: a stature before taking a weight-reducing medicine, a stature after taking the weight-reducing medicine for one month and a stature after taking the weight-reducing medicine for three months. The association element between the three pieces of multimedia information is time of taking the weight-reducing medicine. The multimedia information in the present disclosure implicitly records whether the information is main multimedia information or additional multimedia information. The main multimedia information may be first multimedia information in a time order, multiple multimedia information which attracts the audience most or a summary of all the multimedia information. Forms of the main multimedia information are not limited herein. Taking the above weight-reducing medicine as an example, the main multimedia information may be multimedia information describing the stature before taking the weight-reducing medicine, multimedia information describing the stature after taking the weight-reducing medicine for three months, or multimedia information describing stature change during a process from a time instant when the weight-reducing medicine is not taken to a time instant when the weight-reducing medicine is taken for three months.

In step S102, the main multimedia information is displayed on a display interface.

It should be understood that, the multimedia information in the present disclosure is displayed in a short video playing scenario. Therefore, the main multimedia information may be displayed when a short video playing program is started, or may be displayed when the short video is played for a preset time period or a preset number of short videos are played. For example, after the terminal plays seven short videos of non-advertisement content, an eighth short video played by the terminal is the main multimedia information. Since the main multimedia information is also the short video, the operation logic of the user to the non-advertisement short video also adapts to the main multimedia information. For example, when the user views non-advertisement content, up-sliding and down-sliding respectively indicate playing a next short video and playing a previous short video. Accordingly, when the user performs up-sliding on the main multimedia information, a next non-advertisement short video is played; and when the user performs down-sliding on the main multimedia information, a previous non-advertisement short video is played.

A size of the display interface is consistent with a size of a display screen of a terminal in the present disclosure. A size of a space for displaying the main multimedia information in the display interface may be consistent with the size of the display interface, or may be less than the size of the display interface. That is, the display interface for displaying the main multimedia information occupies only a part of the display screen. Specific configuration is not limited herein. When the size of the space for displaying the main multimedia information is consistent with the size of the display interface, the non-advertisement short video is no longer played when displaying the multimedia information.

In step S103, a cover for the at least one piece of additional multimedia information is determined when the main multimedia information is displayed for a preset time period, and the main multimedia information and the cover are displayed on the display interface.

In the present disclosure, related content (the cover) of the additional multimedia information is displayed when the main multimedia information is displayed for the preset time period, since the cover may shelter a part of the main multimedia information more or less. When the main multimedia information is played for the preset time period and the user performs no operation on the main multimedia information during the time period, it is indicated that the user is interested in the main multimedia information. Then, the cover for the additional multimedia information is determined, and both the main multimedia information and the cover are displayed on the cover. In the present disclosure, the displaying of the cover does not affect a display progress of the main multimedia information. For example, the cover of the additional multimedia information is displayed when the main multimedia information is displayed for three seconds, that is, when the cover of the additional multimedia information is displayed, content after three seconds of the main multimedia information is played, instead of the main multimedia information being played from the start.

Figure 4:
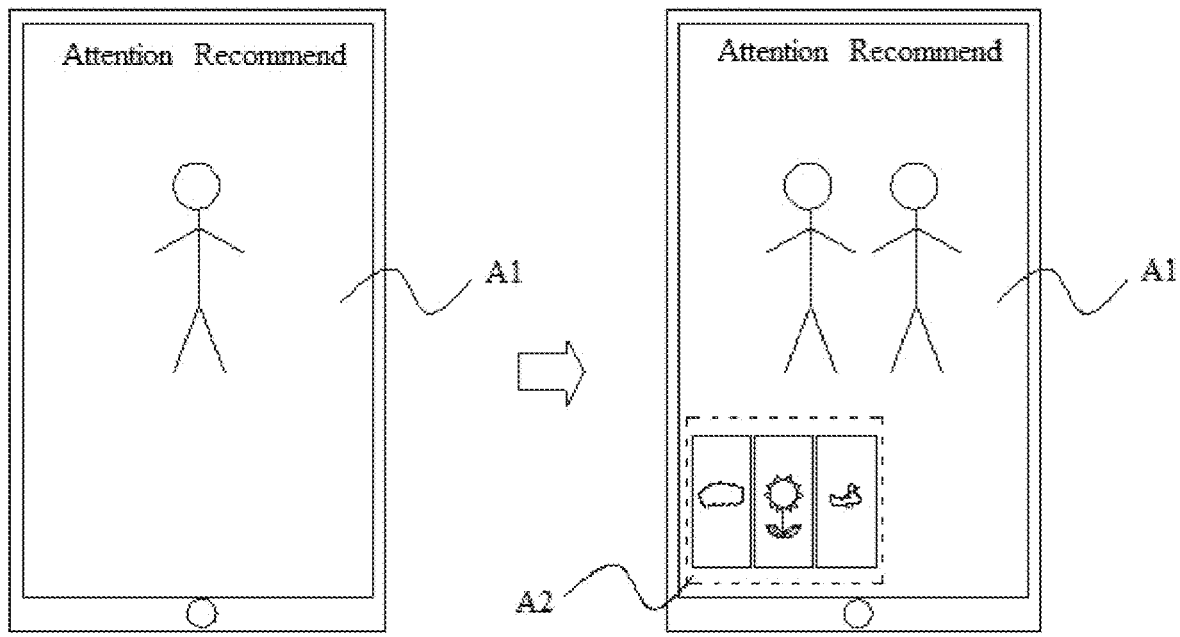
FIG. 4 is a schematic diagram of a scenario of multimedia information display according to an embodiment of the present disclosure.

FIG. 4 shows a schematic diagram of a scenario of multimedia information display according to an embodiment of the present disclosure. Main multimedia information A1 is first displayed in a display interface in FIG. 4. After the main multimedia information A1 is displayed for a preset time period, both the main multimedia information A1 and a cover A2 for multiple pieces of additional multimedia information are displayed on the display interface.

In step S104, in response to a clicking operation on the cover, the main multimedia information displayed on the display interface is switched into additional multimedia information corresponding to the clicking operation.

When the user clicks a cover of certain additional multimedia information in the display interface, the additional multimedia information corresponding to the clicked cover is determined, and the main multimedia information displayed on the display interface is switched into the additional multimedia information, so that the user can view content of the additional multimedia information.

Figure 5:
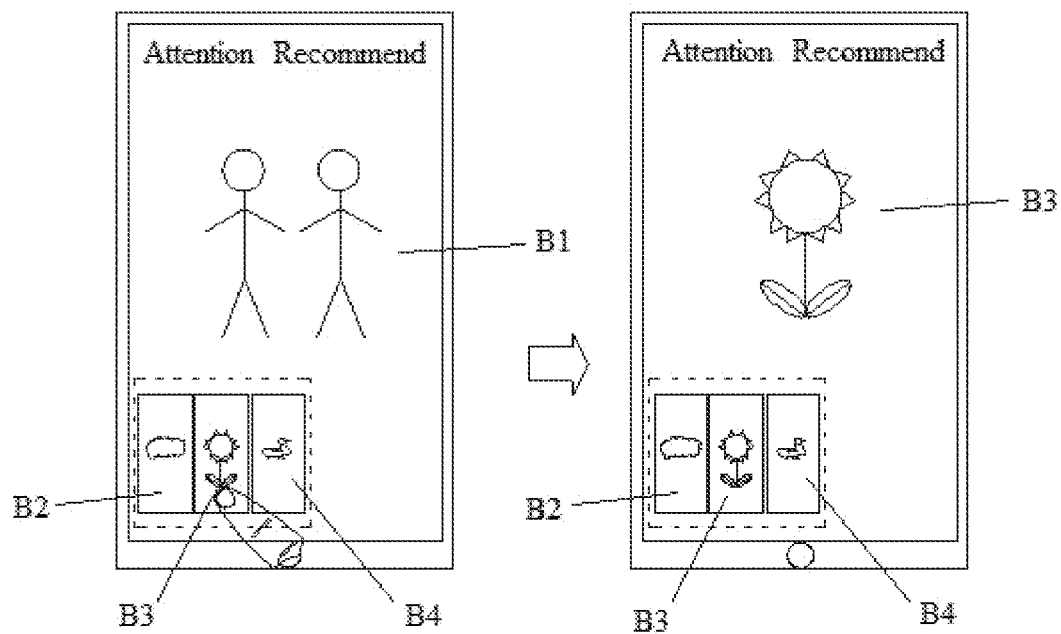
FIG. 5 is a schematic diagram of a scenario of multimedia information display according to another embodiment of the present disclosure.

FIG. 5 shows a schematic diagram of a scenario of multimedia information display according to another embodiment of the present disclosure. Main multimedia information B1, and covers for first additional multimedia information B2, second additional multimedia information B3 and third additional multimedia information B4 are displayed on the display interface. In response to a clicking operation to the cover of the second additional multimedia information B3 by the user, the main multimedia information B1 displayed on the display interface is switched into the second additional multimedia information B3.

According to the present disclosure, the to-be-displayed multimedia information including the main multimedia information and the additional multimedia information is received. When the main multimedia information is displayed for a preset time period, the cover for the additional multimedia information is displayed. In this way, a user can see the additional multimedia information by clicking the cover, thereby displaying multiple pieces of multimedia information in an association manner. When the multimedia information is an advertisement, the user can determine whether to view only a short video advertisement (that is, the main multimedia information) or further view other associated short video advertisement (that is, the additional multimedia information). In this way, the user can view the advertisement more flexibly. Both the main multimedia information and the cover for the additional multimedia information are displayed, so that the user can know the associated short video advertisement even if the user views only one short video advertisement. While in the prior art, multiple short video advertisements are pushed for one time, resulting in that the user can know the entire advertisements only if the user views all short video advertisements. In addition, according to the present disclosure, the additional multimedia information is displayed in response to clicking the cover by the user, and is not enforced to be displayed, thereby pushing the advertisements more friendly and facilitating deep knowing of the multimedia information by the user.

It should be understood that, when the additional multimedia information is displayed on the display interface and a clicking operation for another cover from the user is monitored, the additional multimedia information currently displayed on the display interface is switched into additional multimedia information corresponding to another cover.

According to the above embodiments, in an optional embodiment, the process of displaying the main multimedia information on a display interface includes: establishing a first graph layer, adding the main multimedia information on the first graph layer, and loading the first graph layer to the display interface.

Generally, the graph layer refers to a page formed by films containing words or graphs which are stacked in an order. The graph layer may precisely position elements on the page. Texts, pictures, tables and plug-in may be added into the graph layer, and new graph layer may be embedded or staggered in the graph layer. According to the present disclosure, the first graph layer is established, the main multimedia information is added on the first graph layer, and the first graph layer containing the main multimedia information is loaded to the display interface, thereby displaying the main multimedia information on the display interface.

The process of displaying the main multimedia information and the cover on the display interface includes: establishing a second graph layer, adding the cover for the at least one piece of additional multimedia information to the second graph layer, where the cover has no background color; and loading the second graph layer to the display interface, where the second graph layer is located above the first graph layer.

According to the present disclosure, in view of superposition characteristic of the graph layer, the cover is added to the second graph layer. Since the cover of the additional multimedia information has no background color, that is, the background of the cover is transparent, the second graph is loaded to the display interface and the second graph layer is located above the first graph layer, so that the main multimedia information of the first graph layer is displayed by utilizing the background of the second graph layer.

In the present disclosure, a size of the first graph layer may be consistent with the size of the display interface, and a size of the second graph layer is less than the size of the display interface. In establishing the second graph layer, in addition to setting the size of the second graph layer, a position of the second graph layer in the display interface is also determined, for example, at a lower left corner of the display interface. Display regions of the second graph layer and the cover can be determined in conjunction with the size of the second graph layer.

According to the present disclosure, two graph layers are established; the displayed main multimedia information is added to the first graph layer, the cover is added to the second graph layer; and the two graph layers are loaded to the display interface with the second graph layer being above the first graph layer, thereby improving resource utilization and being beneficial for subsequent flexible control of advertisement content display.

Based on the above embodiments, in an optional embodiment, the process of switching the main multimedia information displayed on the display interface into the additional multimedia information corresponding to the clicking operation includes: switching the main multimedia information in the first graph layer into the additional multimedia information corresponding to the clicked cover to obtain an updated first graph layer, and loading the updated first grapy layer to the display interface.

According to the present disclosure, the multimedia information displayed on the display interface can be quickly switched by switching material on the first graph layer, thereby improving the display flexibility.

Based on the above embodiments, in an optional embodiment, the to-be-displayed multimedia information further includes cover information for the at least one piece of additional multimedia information. It should be noted that, the to-be displayed multimedia information in the present disclosure is generally provided by a publisher of the multimedia information according to a template. In the template, it is stipulated that the publisher of the multimedia information is necessary to provide main multimedia information, additional multimedia information and cover information for the additional multimedia information. The cover information is used to record a cover for the additional multimedia information. In some cases, the publisher of the multimedia information may record the main multimedia information and the additional multimedia information in the to-be-displayed multimedia information and does not record the cover information, and thus the cover information may be empty. Therefore, in the present disclosure, the process of determining a cover for the additional multimedia information includes: in a case that the cover information for the additional multimedia information is not empty, taking a cover recorded in the cover information as the cover for the additional multimedia information; and in a case that the cover information for the additional multimedia information is empty, obtaining a target frame image of the additional multimedia information and a size of the display interface, and cropping the target frame image according to the size to obtain the cover for the additional multimedia information.

In the present disclosure, a target frame image of the additional multimedia information may be a first frame image in the additional multimedia information, or may be a frame image corresponding to highlight in the additional multimedia information. The highlight may refer to a time instant when an advertising agent appears. The highlight of the video may be obtained by machine learning in the present disclosure. For example, each frame image of the additional multimedia information is inputted to a pre-trained target frame obtaining model, to obtain a target frame image outputted from the target frame obtaining model. It should be understood that, before the image is inputted to the target frame obtaining model, the target frame obtaining model may be obtained by: collecting a certain number of sample multimedia information; marking each frame image in the sample multimedia information as a target frame or a non-target frame, where only one frame image serves as the target frame in one piece of sample multiple information; and training an initial model according to each frame image of the sample multimedia information and a label corresponding to the frame image, to obtain a target frame obtaining model. The initial model is a single neural network model, or may be a combination of multiple neural network models.

Based on the above embodiments, in an optional embodiment, the cover of the additional multimedia information further includes display order information of the additional multimedia information. The display order information is displayed in the cover, so that the user views the multimedia information in the display order, thereby better understanding content of the multimedia information and deepening impression for the advertisement.

Based on the above embodiments, in an optional embodiment, after the main multimedia information displayed on the display interface is switched into the additional multimedia information corresponding to the clicking operation, the method further includes: determining, in response to a sliding operation to the additional multimedia information, the to-be-displayed multimedia information according to the a sliding direction indicated by the sliding operation and the display order information of the additional multimedia information; and switching the additional multimedia information displayed on the display interface into the to-be-displayed multimedia information.

In the present disclosure, a logic relationship between the sliding direction and the to-be-displayed multimedia information may be set in advance. For example, sliding to the left indicates that the to-be-displayed multimedia information is the main multimedia information; up-sliding indicates that the to-be-displayed multimedia information is next additional multimedia information of currently displayed additional multimedia information in the display order; and down-sliding indicates that the to-be-displayed multimedia information is previous additional multimedia information of the currently displayed additional multimedia information in the display order. Multiple types of operation logic re preset, so that the multimedia information is played more conveniently, thereby avoiding the problem that fingers are not convenient to click the multimedia information when operating the terminal with a single hand.

Figure 6:
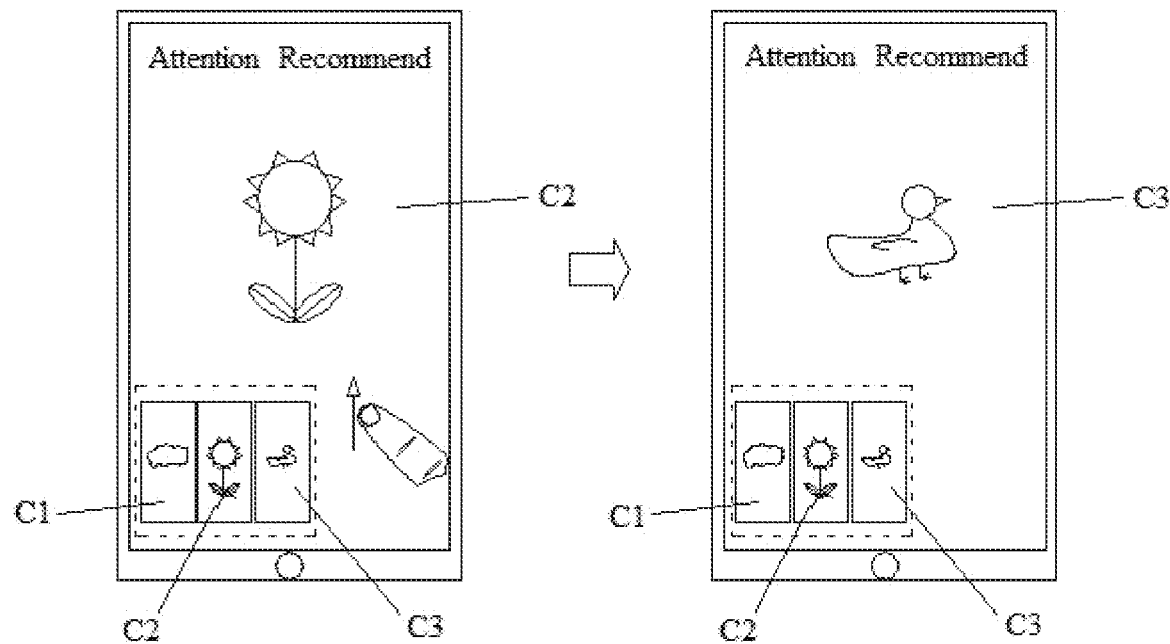
FIG. 6 is a schematic diagram of a scenario of multimedia information display according to another embodiment of the present disclosure.

FIG. 6 shows a schematic diagram of a scenario of multimedia information display according to another embodiment of the present disclosure. Second additional multimedia information C2 and covers for the first additional multimedia information C1, the second multimedia information C2 and the third additional multimedia information C3 are displayed in a display interface in FIG. 6. In response to an up-sliding operation on the second additional multimedia information C2, the third additional multimedia information C3 serves as the to-be-displayed additional multimedia information, and the second additional multimedia information C2 displayed on the display interface is switched into the third additional multimedia information C3.

Figure 7:
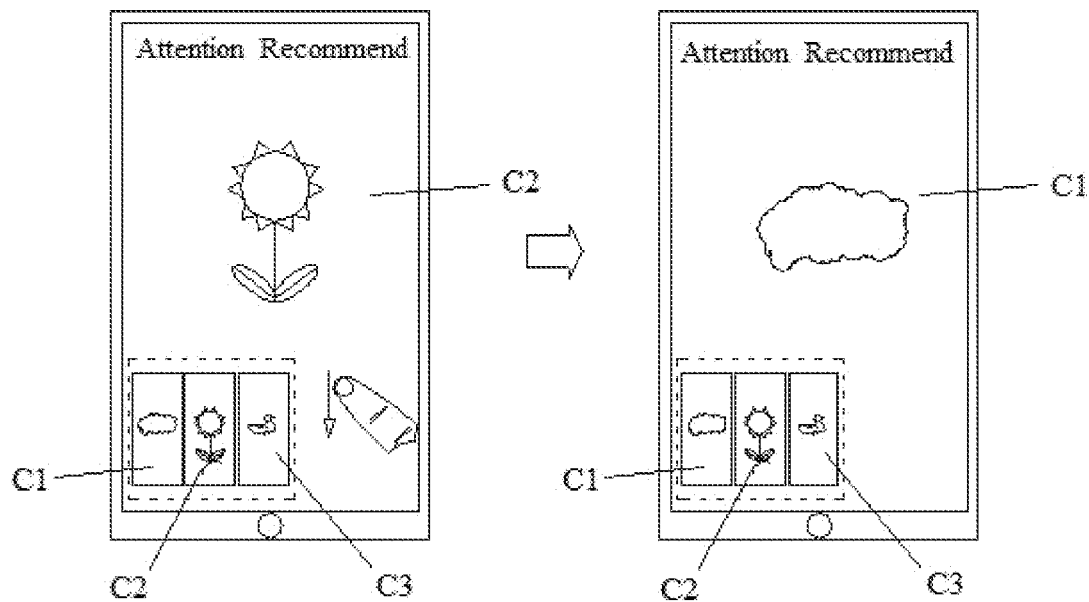
FIG. 7 is a schematic diagram of a scenario of multimedia information display according to another embodiment of the present disclosure.

FIG. 7 shows a schematic diagram of a scenario of multimedia information display according to another embodiment of the present disclosure. Second additional multimedia information C2 and covers for the first additional multimedia information C1, the second multimedia information C2 and the third additional multimedia information C3 are displayed in a display interface in FIG. 7. In response to a down-sliding operation on the second additional multimedia information C2, the first additional multimedia information C1 serves as the to-be-displayed additional multimedia information, and the second additional multimedia information C2 displayed on the display interface is switched into the first additional multimedia information C1.

Figure 8:
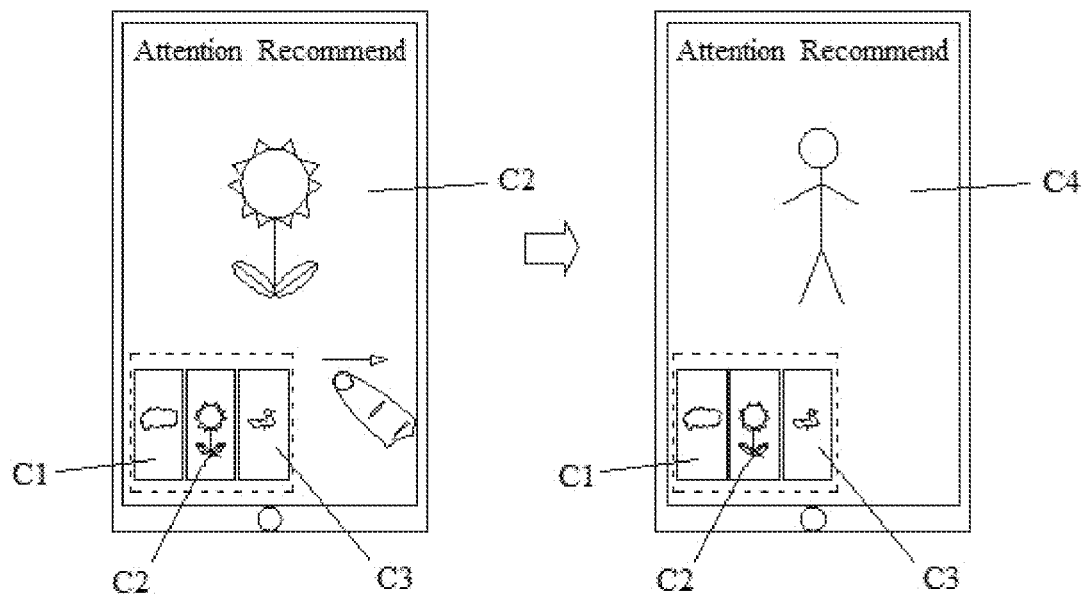
FIG. 8 is a schematic diagram of a scenario of multimedia information display according to another embodiment of the present disclosure.

FIG. 8 shows a schematic diagram of a scenario of multimedia information display according to another embodiment of the present disclosure. Second additional multimedia information C2 and covers for the first additional multimedia information C1, the second multimedia information C2 and the third additional multimedia information C3 are displayed in a display interface in FIG. 8. In response to a right-sliding operation on the second additional multimedia information C2, main multimedia information C4 serves as the to-be-displayed additional multimedia information, and the second additional multimedia information C2 displayed on the display interface is switched into the main multimedia information C4.

Based on the above embodiments, in an optional embodiment, after the main multimedia information is displayed on the display interface, the method further includes: switching, in response to the sliding operation to the main multimedia information, the main multimedia information displayed on the display interface into information which is not the to-be-displayed multimedia information.

In the present disclosure, the main multimedia information is played between two non-advertisement contents. Therefore, in response to the sliding operation on the main multimedia information, the main multimedia information is switched into non-advertisement content for displaying. If the main multimedia information is played between non-advertisement contents A and B, in response to the up-sliding operation on the main multimedia information, the main multimedia information displayed on the display interface is switched into the non-advertisement content B; and in response to down-sliding operation on the main multimedia information, the main multimedia information displayed on the display interface is switched into the non-advertisement content A.

Based on the above embodiments, in an optional embodiment, the to-be-displayed multimedia information further includes account information of a publisher of the multimedia information. The process of displaying the main multimedia information on the display interface includes: establishing a third graph layer, adding the account information of the publisher of the multimedia information to the third graph layer, and loading the third graph layer to the display interface, where the account information has no background color, the third graph layer is located above the first graph layer, and the account information of the publisher of the multimedia information does not overlap with the cover for the at least one piece of additional multimedia information in the display interface.

According to the present disclosure, account information of a publisher of the multimedia information is also displayed on the display interface, when the multimedia information is displayed. The account information is added through the third graph layer. In this way, the user can enter a home page of the publisher of the multimedia information to browse more information related to the publisher of the multimedia information. The account information of the publisher of the multimedia information may be a head portrait of the publisher, an official network of the publisher and so on. Forms of the account information are not limited herein.

Figure 9:
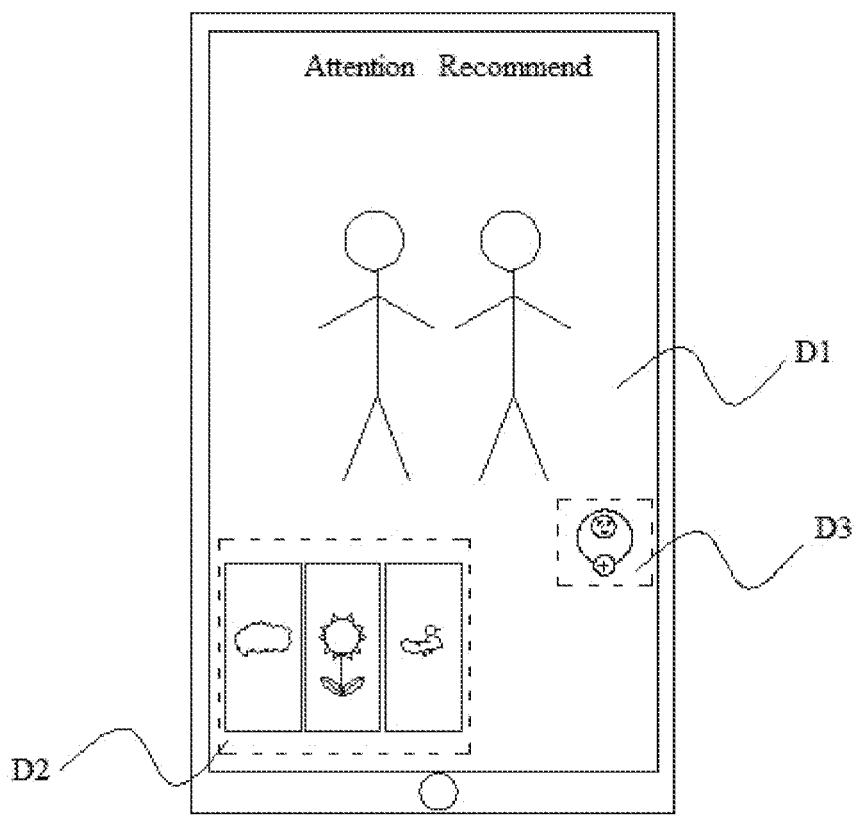
FIG. 9 is a schematic diagram of a scenario of multimedia information display according to another embodiment of the present disclosure.

FIG. 9 shows a schematic diagram of a scenario of multimedia information display according to another embodiment of the present disclosure. A display interface in FIG. 9 includes a first graph layer D1, a second graph layer D2 and a third graph layer D3. The first graph layer D1 contains multimedia information being displayed which may be main multimedia information or additional multimedia information. The second graph layer D2 contains a cover of the additional multimedia information. The third graph layer D3 contains account information of the publisher of the multimedia information. It can be seen from FIG. 9 that, the cover is displayed at a lower left corner of the display interface, the account information of the advertisement is displayed at a right side in the display interface, and the cover does not overlap with the account information, thereby being convenient for the user to view different information in the display interface.

Based on the above embodiments, in an optional embodiment, the method further includes: sending a request for obtaining home page information of the publisher of the multimedia information to a server in response to a clicking operation to the account information; and receiving the home page information of the publisher of the multimedia information, switching the multimedia information in the first graph layer into the home page information to obtain an updated first graph layer, and loading the updated first graph layer to the display interface.

It should be understood that, when the third graph layer is pushed to the display interface and is displayed, change of the multimedia information is realized by updating the first graph layer without affecting displaying of the second graph layer and the third graph layer. When the display interface starts to display the multimedia information (including the main multimedia information and the additional multimedia information), content displayed on the second graph layer and the third graph layer does not change. When the user clicks the account information of the publisher of the multimedia information, a terminal sends a request for obtaining home page information of the publisher of the multimedia information to a server. When the home page information of the publisher of the multimedia information is received, the home page information is adjusted according to a size of the display interface, the multimedia information in the first graph is switched into information of the home page which is subjected to size adjustment, and the updated first graph layer is loaded to the display interface, thereby displaying the home page information. The home page information in the present disclosure may refer to a home page of the publisher of the multimedia information on a short video application, or may be an official network address of the publisher of the multimedia information.

Based on the above embodiments, in an optional embodiment, after the main multimedia information displayed on the display interface is switched into information which is not the to-be-displayed multimedia information, the method further includes: obtaining display information of the to-be-displayed multimedia information, so that the server updates the main multimedia information according to the display information, where the display information includes one or more of: playing time of the multimedia information, the number of click operations to the cover and an order of clicking the cover.

It should be noted that, in the present disclosure, display information is obtained when it is switched from the main multimedia information to the non-advertisement content, to completely collect operations on the multimedia information in the to-be-displayed multimedia information from the user.

The display information includes playing time of the multimedia information, the number of clicking operation on the cover and an order of clicking the cover. A longer playing time of the multimedia information indicates that the user is more interested in the multimedia information. The number of clicking operation on the cover and the order of clicking the cover also reflect preference of the user for different multimedia information. In this case, the server can update the main multimedia information according to display information of mass users. For example, if a playing duration of the main multimedia information is apparently less than a playing duration of certain additional multimedia information in the to-be-displayed multimedia information, it is indicated that more users are more interested in the additional multimedia information than the main multimedia information. In this case, the additional multimedia information may be set as new main multimedia information, the original main multimedia information is set as additional multimedia information, and display sequence information of the new additional multimedia information is set. The updated to-be-displayed multimedia information is sent to the terminal, so that the terminal displays the multimedia information in a new manner next time. More users are more interested in the main multimedia information in the new to-be-displayed multimedia information, thereby increasing attention of the users for the multimedia information.

It should be noted that, the display information may be obtained by the terminal or the server in the present disclosure. In a case that the display information is obtained by the server, the process is as follows. The terminal collects a playing duration of the multimedia information, the number of clicking operation for the cover and the order of clicking the cover in real time, and sends the collected information to the server. The server counts the display information, when the terminal displays the non-advertisement content instead of the main multimedia information displayed on the display interface.

Figure 10:
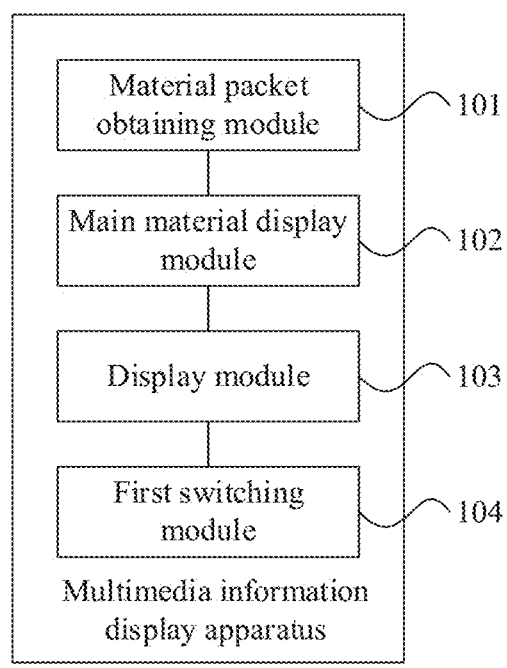
FIG. 10 is a schematic structural diagram of a multimedia information display apparatus according to an embodiment of the present disclosure.

A multimedia information display apparatus is provided according to embodiments of the present disclosure. As shown in FIG. 10, the apparatus includes a material packet obtaining module 101, a main material display module 102, a display module 103 and a first switching module 104. The material packet obtaining module 101 is configured to obtain to-be-displayed multimedia information. The to-be-displayed multimedia information includes main multimedia information and at least one piece of additional multimedia information having an association relationship. The main material display module 102 is configured to display the main multimedia information on a display interface. The display module 103 is configured to determine a cover for the at least one piece of additional multimedia information when the main multimedia information is displayed for a preset time period, and display the main multimedia information and the cover on the display interface. The first switching module 104 is configured to switch, in response a clicking operation on the cover, the main multimedia information displayed on the display interface into the additional multimedia information corresponding to the clicking operation.

The multimedia information display apparatus provided in the embodiment of the present disclosure is configured to perform the flows in the above method embodiments. One may refer to the description of the above embodiments of the multimedia information display method, and details are not repeated herein. According to the multimedia information display apparatus in the embodiments of the present disclosure, the to-be-displayed multimedia information including the main multimedia information and the additional multimedia information is received. When the main multimedia information is displayed for a preset time period, the cover for the additional multimedia information is displayed. In this way, a user can see the additional multimedia information by clicking the cover, thereby displaying multiple pieces of multimedia information in an association manner. In addition, according to the present disclosure, the additional multimedia information is displayed in response to clicking the cover by the user, and is not enforced to be displayed, thereby pushing the advertisements more friendly and facilitating deep knowing of the multimedia information by the user.

Based on the above embodiments, in an optional embodiment, the main material display module includes: a first graph layer establishing sub-module. The first graph layer establishing sub-module is configured to establish a first graph layer, add the main multimedia information on the first graph layer, and load the first graph layer to the display interface. The display module includes a display sub-module configured to display both the main multimedia information and the cover on the display interface. The display sub-module includes a second graph layer establishing unit and a second graph layer loading unit. The second graph layer establishing unit is configured to establish a second graph layer, add the cover for the at least one piece of additional multimedia information to the second graph layer, where the cover has no background color. The second graph layer loading unit is configured to load the second graph layer to the display interface, where the second graph layer is located above the first graph layer.

Based on the above embodiments, in an optional embodiment, the first switching module is configured to: switch the main multimedia information in the first graph layer into the additional multimedia information corresponding to the clicked cover to obtain an updated first graph layer, and load the updated first grapy layer to the display interface.

Based on the above embodiments, in an optional embodiment, the to-be-displayed multimedia information further includes cover information for the at least one piece of additional multimedia information. The display module includes a cover determining sub-module configured to determine a cover for at least one piece of additional multimedia information. The cover determining sub-module is configured to: in a case that the cover information for the additional multimedia information is not empty, take a cover recorded in the cover information as the cover for the additional multimedia information; and in a case that the cover information for the additional multimedia information is empty, obtain a target frame image of the additional multimedia information and a size of the display interface, and crop the target frame image according to the size to obtain the cover for the additional multimedia information.

Based on the above embodiments, in an optional embodiment, the cover further includes display order information of the additional multimedia information.

Based on the above embodiments, in an optional embodiment, the display apparatus includes a sliding operation response module and a second switching module. The sliding operation response module is configured to: determine, in response to a sliding operation to the additional multimedia information, the to-be-displayed multimedia information according to a sliding direction indicated by the sliding operation and the display order information of the additional multimedia information. The second switching module is configured to switch the additional multimedia information displayed on the display interface into the to-be-displayed multimedia information.

Based on the above embodiments, in an optional embodiment, the display apparatus includes a third switching module. The third switching module is configured to switch, in response to the sliding operation to the main multimedia information, the main multimedia information displayed on the display interface into information which is not the to-be-displayed multimedia information.

Based on the above embodiments, in an optional embodiment, the to-be-displayed multimedia information further includes account information of a publisher of the multimedia information. The main material display module includes a third graph layer establishing module. The third graph layer establishing module is configured to: establish a third graph layer, add the account information of the publisher of the multimedia information to the third graph layer, and load the third graph layer to the display interface, where the account information has no background color, the third graph layer is located above the first graph layer, and the account information of the publisher of the multimedia information does not overlap with the cover for the at least one piece of additional multimedia information in the display interface.

Based on the above embodiments, in an optional embodiment, the apparatus further includes a clicking operation response module and a fourth switching module. The clicking operation response module is configured to: send a request for obtaining home page information of the publisher of the multimedia information to a server in response to a clicking operation to the account information. The fourth switching module is configured to: receive the home page information of the publisher of the multimedia information, switch the multimedia information in the first graph layer into the home page information to obtain an updated first graph layer, and load the updated first graph layer to the display interface.

Based on the above embodiments, in an optional embodiment, the apparatus further includes a statistical data generating module configured to: generate display information of the to-be-displayed multimedia information, so that the server updates the main multimedia information according to the display information, where the display information includes one or more of: playing time of the multimedia information, the number of click operations to the cover and an order of clicking the cover.

An electronic device is provided according to embodiments of the present disclosure. The electronic device includes: a memory, a processor and at least one program. The program is stored in the memory and is executed by the processor to perform the methods described above. The to-be-displayed multimedia information including the main multimedia information and the additional multimedia information is received. When the main multimedia information is displayed for a preset time period, the cover for the additional multimedia information is displayed. In this way, a user can see the additional multimedia information by clicking the cover, thereby displaying multiple pieces of multimedia information in an association manner. When the multimedia information is an advertisement, the user can determine whether to view only a short video advertisement (that is, the main multimedia information) or further view other associated short video advertisement (that is, the additional multimedia information). In this way, the user can view the advertisement more flexibly. Both the main multimedia information and the cover for the additional multimedia information are displayed, so that the user can know the associated short video advertisement even if the user views only one short video advertisement. While in the prior art, multiple short video advertisements are pushed for one time, resulting in that the user can know the entire advertisements only if the user views all short video advertisements. In addition, according to the present disclosure, the additional multimedia information is displayed in response to clicking the cover by the user, and is not enforced to be displayed, thereby pushing the advertisements more friendly and facilitating deep knowing of the multimedia information by the user.

Figure 11:
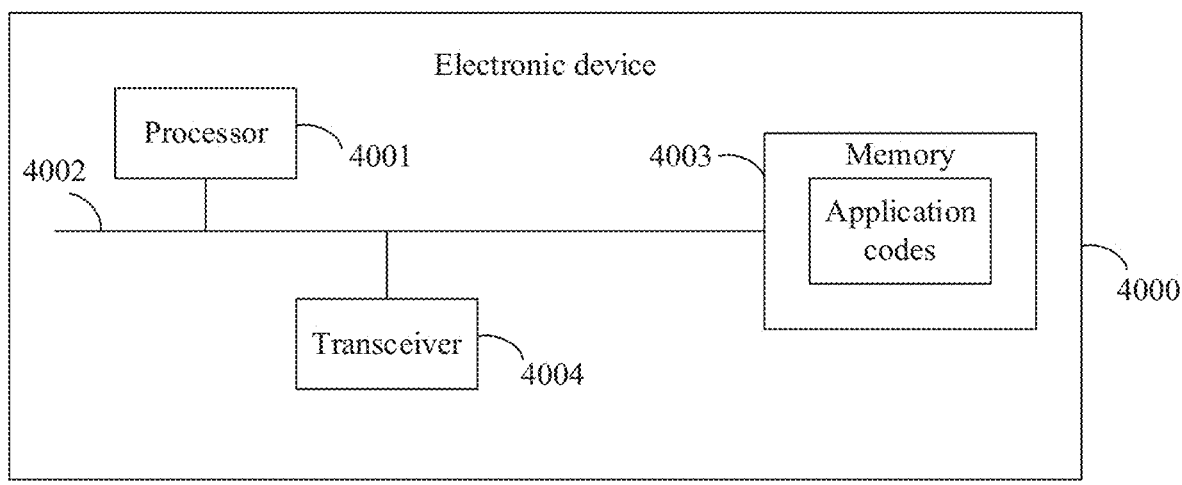
FIG. 11 is a schematic structural diagram of an electronic device according to an embodiment of the present disclosure.

An electronic device is provided according to an optional embodiment. As shown in FIG. 11, the electronic device 400 includes a processor 4001 and a memory 4003. The processor 4001 is connected to the memory 4003 via a bus 4002. Optionally, the electronic device 4000 further includes a transceiver 4004. It should be noted that, the number of the transceiver 4004 is not limited to one in an actual application, and the structure of the electronic device 4000 does not limit the embodiments of the present disclosure.

The processor 4001 may be CPU (Central Processing unit), a general-purpose processor, a DSP (Digital Signal Processor), an ASIC (Application Specific Integrated Circuit), an FPGA (Field Programmable Gate Array), other programmable logic components, a transistor logic component, a hardware component or any combination thereof. The processor 4001 may implement or perform logic blocks, modules and circuits described according to the present disclosure. The processor 4001 may implement combination of calculation functions, for example, including a combination of one or more microprocessors, or a combination of DSP and a microprocessor.

The bus 4002 may include a path through which information is transferred between the above components. The bus 4002 may be a PCI (Peripheral Component Interconnect) bus or an EISA (Extended Industry Standard Architecture) bus. The bus 4002 may be an address bus, a data bus, a control bus. For convenience of illustration, the bus 4002 is indicated by a thick line in FIG. 11, which does not indicate that the bus 4002 is only one bus or one type of bus.

The memory 4003 may be ROM (Read Only Memory), other type of static storage device storing static information and instructions, RAM (Random Access Memory) or other type of dynamic storage device storing information and instructions, EEPROM (Electrically Erasable Programmable Read Only Memory), CD-ROM (Compact Disc Read Only Memory), other optical disk storage, optical disk storage (such as compressed optical disk, laser optical disk, an optical disk, a digital general-purpose optical disk, a blue ray optical disk), magnetic disk storage medium, magnetic storage device, and other mediums carrying or storing expected program codes in a form of instruction or data structure and accessible by a computer.

The memory 4003 is configured to store the application codes according to the technical solution of the present disclosure, and the codes are executed by the processor 4001. The processor 4001 is configured to execute the application codes stored in the memory 4003 to implement the method embodiments described above.

A computer readable storage medium storing computer programs is provided according to embodiments of the present disclosure. The computer programs, when being executed by a computer, cause the computer to implement the method embodiments described above. The to-be-displayed multimedia information including the main multimedia information and the additional multimedia information is received. When the main multimedia information is displayed for a preset time period, the cover for the additional multimedia information is displayed. In this way, a user can see the additional multimedia information by clicking the cover, thereby displaying multiple pieces of multimedia information in an association manner. When the multimedia information is an advertisement, the user can determine whether to view only a short video advertisement (that is, the main multimedia information) or further view other associated short video advertisement (that is, the additional multimedia information). In this way, the user can view the advertisement more flexibly. Both the main multimedia information and the cover for the additional multimedia information are displayed, so that the user can know the associated short video advertisement even if the user views only one short video advertisement. While in the prior art, multiple short video advertisements are pushed for one time, resulting in that the user can know the entire advertisements only if the user views all short video advertisements. In addition, according to the present disclosure, the additional multimedia information is displayed in response to clicking the cover by the user, and is not enforced to be displayed, thereby pushing the advertisements more friendly and facilitating deep knowing of the multimedia information by the user.

It should be understood that, although steps in the flowcharts are displayed according to indication of arrows, the steps are unnecessary to be performed in an order indicated by the arrows. The steps may be performed in other orders, unless explicitly indicated. At least a part of the steps in the flowcharts may include multiple sub-steps or sub-stages. The sub-steps or sub-stages are unnecessary to be performed at a same time instant, and may be performed at different time instants. The sub-steps are unnecessary to be performed in sequence, and other steps or at least a part of sub-steps or sub-stages of other steps may be performed alternately.

Only a part of the embodiments of the present discourse are described above. It should be noted that, those skilled in the art may make several improvement and modification to the embodiments without departing from the principle of the present disclosure. The improvement and modification should be regarded as falling within the protection scope of the present disclosure.

A multimedia information display method is provided according to the present disclosure. The method includes: obtaining to-be-displayed multimedia information, where the to-be-displayed multimedia information includes main multimedia information and at least one piece of additional multimedia information having an association relationship; displaying the main multimedia information on a display interface; determining a cover for the at least one piece of additional multimedia information when the main multimedia information is displayed for a preset time period, and displaying the main multimedia information and the cover on the display interface; and switching, in response a clicking operation on the cover, the main multimedia information displayed on the display interface into the additional multimedia information corresponding to the clicking operation.

In an embodiment, the process of displaying the main multimedia information on a display interface includes: establishing a first graph layer, adding the main multimedia information on the first graph layer, and loading the first graph layer to the display interface. The process of displaying the main multimedia information and the cover on the display interface includes: establishing a second graph layer, adding the cover for the at least one piece of additional multimedia information to the second graph layer, where the cover has no background color; and loading the second graph layer to the display interface, where the second graph layer is located above the first graph layer.

In an embodiment, the process of switching the main multimedia information displayed on the display interface into the additional multimedia information corresponding to the clicking operation includes: switching the main multimedia information in the first graph layer into the additional multimedia information corresponding to the clicked cover to obtain an updated first graph layer, and loading the updated first graph layer to the display interface.

In an embodiment, the to-be-displayed multimedia information further includes cover information for the at least one piece of additional multimedia information. The process of determining a cover for the at least one piece of additional multimedia information includes: in a case that the cover information for the additional multimedia information is not empty, taking a cover recorded in the cover information as the cover for the additional multimedia information; and in a case that the cover information for the additional multimedia information is empty, obtaining a target frame image of the additional multimedia information and a size of the display interface, and cropping the target frame image according to the size to obtain the cover for the additional multimedia information.

In an embodiment, the cover further includes display order information of the additional multimedia information.

In an embodiment, after the main multimedia information displayed on the display interface is switched into the additional multimedia information corresponding to the clicking operation, the method further includes: determining, in response to a sliding operation to the additional multimedia information, the to-be-displayed multimedia information according to a sliding direction indicated by the sliding operation and the display order information of the additional multimedia information; and switching the additional multimedia information displayed on the display interface into the to-be-displayed multimedia information.

In an embodiment, after the main multimedia information is displayed on the display interface, the method further includes: switching, in response to the sliding operation to the main multimedia information, the main multimedia information displayed on the display interface into information which is not the to-be-displayed multimedia information.

In an embodiment, the to-be-displayed multimedia information further includes account information of a publisher of the multimedia information. The process of displaying the main multimedia information on the display interface further includes: establishing a third graph layer, adding the account information of the publisher of the multimedia information to the third graph layer, and loading the third graph layer to the display interface, where the account information has no background color, the third graph layer is located above the first graph layer, and the account information of the publisher of the multimedia information does not overlap with the cover for the at least one piece of additional multimedia information in the display interface.

In an embodiment, the multimedia information display method further includes: sending a request for obtaining home page information of the publisher of the multimedia information to a server in response to a clicking operation to the account information; and receiving the home page information of the publisher of the multimedia information, switching the multimedia information in the first graph layer into the home page information to obtain an updated first graph layer, and loading the updated first graph layer to the display interface.

In an embodiment, after the main multimedia information displayed on the display interface is switched into information which is not the to-be-displayed multimedia information, the method further includes: generating display information of the to-be-displayed multimedia information, so that the server updates the main multimedia information according to the display information, where the display information includes one or more of: playing time of the multimedia information, the number of click operations to the cover and an order of clicking the cover.

A multimedia information display apparatus is provided according to embodiments of the present disclosure. The apparatus includes a material packet obtaining module, a main material display module, a display module and a first switching module. The material packet obtaining module is configured to obtain to-be-displayed multimedia information. The to-be-displayed multimedia information includes main multimedia information and at least one piece of additional multimedia information having an association relationship. The main material display module is configured to display the main multimedia information on a display interface. The display module is configured to determine a cover for the at least one piece of additional multimedia information when the main multimedia information is displayed for a preset time period, and display the main multimedia information and the cover on the display interface. The first switching module is configured to switch, in response a clicking operation on the cover, the main multimedia information displayed on the display interface into the additional multimedia information corresponding to the clicking operation.

In an embodiment, the main material display module includes: a first graph layer establishing sub-module. The first graph layer establishing sub-module is configured to establish a first graph layer, add the main multimedia information on the first graph layer, and load the first graph layer to the display interface. The display module includes a display sub-module configured to display both the main multimedia information and the cover on the display interface. The display sub-module includes a second graph layer establishing unit and a second graph layer loading unit. The second graph layer establishing unit is configured to establish a second graph layer, add the cover for the at least one piece of additional multimedia information to the second graph layer, where the cover has no background color. The second graph layer loading unit is configured to load the second graph layer to the display interface, where the second graph layer is located above the first graph layer.

In an embodiment, the first switching module is configured to: switch the main multimedia information in the first graph layer into the additional multimedia information corresponding to the clicked cover to obtain an updated first graph layer, and load the updated first graph layer to the display interface.

In an embodiment, the to-be-displayed multimedia information further includes cover information for the at least one piece of additional multimedia information. The display module includes a cover determining sub-module configured to determine a cover for at least one piece of additional multimedia information. The cover determining sub-module is configured to: in a case that the cover information for the additional multimedia information is not empty, take a cover recorded in the cover information as the cover for the additional multimedia information; and in a case that the cover information for the additional multimedia information is empty, obtain a target frame image of the additional multimedia information and a size of the display interface, and crop the target frame image according to the size to obtain the cover for the additional multimedia information.

In an embodiment, the cover further includes display order information of the additional multimedia information.

In an embodiment, the display apparatus includes a sliding operation response module and a second switching module. The sliding operation response module is configured to: determine, in response to a sliding operation to the additional multimedia information, the to-be-displayed multimedia information according to a sliding direction indicated by the sliding operation and the display order information of the additional multimedia information. The second switching module is configured to switch the additional multimedia information displayed on the display interface into the to-be-displayed multimedia information.

In an embodiment, the display apparatus includes a third switching module. The third switching module is configured to switch, in response to the sliding operation to the main multimedia information, the main multimedia information displayed on the display interface into information which is not the to-be-displayed multimedia information.

In an embodiment, the to-be-displayed multimedia information further includes account information of a publisher of the multimedia information. The main material display module includes a third graph layer establishing module. The third graph layer establishing module is configured to: establish a third graph layer, add the account information of the publisher of the multimedia information to the third graph layer, and load the third graph layer to the display interface, where the account information has no background color, the third graph layer is located above the first graph layer, and the account information of the publisher of the multimedia information does not overlap with the cover for the at least one piece of additional multimedia information in the display interface.

In an embodiment, the display apparatus further includes a clicking operation response module and a fourth switching module. The clicking operation response module is configured to: send a request for obtaining home page information of the publisher of the multimedia information to a server in response to a clicking operation to the account information. The fourth switching module is configured to: receive the home page information of the publisher of the multimedia information, switch the multimedia information in the first graph layer into the home page information to obtain an updated first graph layer, and load the updated first graph layer to the display interface.

In an embodiment, the apparatus further includes: a statistical data generating module configured to: generate display information of the to-be-displayed multimedia information, so that the server updates the main multimedia information according to the display information, where the display information includes one or more of: playing time of the multimedia information, the number of click operations to the cover and an order of clicking the cover.

The invention claimed is:

1. A multimedia information display method, comprising:
   obtaining multimedia information that comprises main multimedia information and at least one piece of additional multimedia information having an association relationship with the main multimedia information, the main multimedia information and the additional multimedia information being advertisements;
   displaying the main multimedia information on a display interface;
   acquiring a cover for the at least one piece of additional multimedia information when the main multimedia information is displayed for a preset time period, and displaying the main multimedia information and the cover on the display interface, wherein the cover displays the at least one piece of additional multimedia information; and switching, in response to a clicking operation on the cover, the main multimedia information displayed on the display interface to the additional multimedia information corresponding to the clicking operation, and displaying the additional multimedia information on the display interface along with the cover, wherein the cover further comprises a first additional multimedia information and a second additional multimedia information and display order information of the first additional multimedia information and the second additional multimedia information;

acquiring, in response to a sliding operation for the additional multimedia information after the switch, a to-be-displayed multimedia information according to a sliding direction indicated by the sliding operation and the display order information, wherein the to-be-displayed multimedia information is the first additional multimedia information when the sliding direction is in a first direction, and the to-be-displayed multimedia information is the second additional multimedia information when the sliding direction is in a second direction, wherein a logic relationship between the sliding direction and the to-be-displayed multimedia information is set in advance; and switching the additional multimedia information displayed on the display interface to the to-be-displayed multimedia information.

2. The multimedia information display method according to claim 1, wherein the displaying the main multimedia information on a display interface comprises:

establishing a first graph layer, adding the main multimedia information on the first graph layer, and loading the first graph layer to the display interface;

wherein the displaying the main multimedia information and the cover on the display interface comprises:

establishing a second graph layer, adding the cover for the at least one piece of additional multimedia information to the second graph layer, wherein the cover has no background color; and loading the second graph layer to the display interface, wherein the second graph layer is located above the first graph layer.

3. The multimedia information display method according to claim 2, wherein the switching the main multimedia information displayed on the display interface into the additional multimedia information corresponding to the clicking operation comprises:

switching the main multimedia information in the first graph layer into the additional multimedia information corresponding to the clicked cover to obtain an updated first graph layer, and loading the updated first graph layer to the display interface.

4. The multimedia information display method according to claim 2, wherein the to-be-displayed multimedia information further comprises account information of a publisher of the multimedia information;

wherein the displaying the main multimedia information on the display interface comprises:

establishing a third graph layer, adding the account information of the publisher of the multimedia information to the third graph layer, and loading the third graph layer to the display interface, wherein the account information has no background color, the third graph layer is located above the first graph layer, and the account information of the publisher of the multimedia information does not overlap with the cover for the at least one piece of additional multimedia information in the display interface.

5. The multimedia information display method according to claim 4, further comprising:

sending a request for obtaining home page information of the publisher of the multimedia information to a server in response to a clicking operation to the account information; and receiving the home page information of the publisher of the multimedia information, switching the multimedia information in the first graph layer into the home page information to obtain an updated first graph layer, and loading the updated first graph layer to the display interface.

6. The multimedia information display method according to claim 1, wherein the to-be-displayed multimedia information further comprises cover information for the at least one piece of additional multimedia information;

wherein the acquiring a cover for the at least one piece of additional multimedia information comprises:

in a case that the cover information for the additional multimedia information is not empty, taking a cover recorded in the cover information as the cover for the additional multimedia information; and in a case that the cover information for the additional multimedia information is empty, obtaining a target frame image of the additional multimedia information and a size of the display interface, and cropping the target frame image according to the size to obtain the cover for the additional multimedia information.

7. The multimedia information display method according to claim 1, wherein after the displaying the main multimedia information on the display interface, the method further comprises:

switching, in response to the sliding operation to the main multimedia information, the main multimedia information displayed on the display interface into information which is not the to-be-displayed multimedia information.

8. The multimedia information display method according to claim 7, wherein after the switching the main multimedia information displayed on the display interface into information which is not the to-be-displayed multimedia information, the method further comprises:

obtaining display information of the to-be-displayed multimedia information, so that the server updates the main multimedia information according to the display information, wherein the display information comprises one or more of: playing time of the multimedia information, the number of click operations to the cover and an order of clicking the cover.

9. An electronic device, comprising at least one processor; and at least one memory communicatively coupled to the at least one processor and storing instructions that upon execution by the at least one processor cause the electronic device to:

obtain multimedia information that comprises main multimedia information and at least one piece of additional multimedia information having an association relationship with the main multimedia information, the main multimedia information and the additional multimedia information being advertisements;

display the main multimedia information on a display interface;

acquire a cover for the at least one piece of additional multimedia information when the main multimedia information is displayed fora preset time period, and displaying the main multimedia information and the cover on the display interface, wherein the cover displays the at least one piece of additional multimedia information; and switch, in response to a clicking operation on the cover, the main multimedia information displayed on the display interface to the additional multimedia information corresponding to the clicking operation, and displaying the additional multimedia information on the display interface along with the cover, wherein the cover further comprises a first additional multimedia information and a second additional multimedia information and display order information of the first additional multimedia information and the second additional multimedia information;

acquire, in response to a sliding operation for the additional multimedia information after the switch, a to-be-displayed multimedia information according to a sliding direction indicated by the sliding operation and the display order information, wherein the to-be-displayed multimedia information is the first additional multimedia information when the sliding direction is in a first direction, and the to-be-displayed multimedia information is the second additional multimedia information when the sliding direction is in a second direction, wherein a logic relationship between the sliding direction and the to-be-displayed multimedia information is set in advance; and switch the additional multimedia information displayed on the display interface to the to-be-displayed multimedia information.

10. The electronic device of claim 9, the at least one memory further storing instructions that upon execution by the at least one processor cause the electronic device to:
establish a first graph layer, adding the main multimedia information on the first graph layer, and loading the first graph layer to the display interface;
establish a second graph layer, adding the cover for the at least one piece of additional multimedia information to the second graph layer, wherein the cover has no background color; and
load the second graph layer to the display interface, wherein the second graph layer is located above the first graph layer.

11. The electronic device of claim 10, the at least one memory further storing instructions that upon execution by the at least one processor cause the electronic device to:
switch the main multimedia information in the first graph layer into the additional multimedia information corresponding to the clicked cover to obtain an updated first graph layer, and loading the updated first graph layer to the display interface.

12. The electronic device of claim 9, wherein the to-be-displayed multimedia information further comprises cover information for the at least one piece of additional multimedia information;
the at least one memory further storing instructions that upon execution by the at least one processor cause the electronic device to:
in a case that the cover information for the additional multimedia information is not empty, take a cover recorded in the cover information as the cover for the additional multimedia information; and
in a case that the cover information for the additional multimedia information is empty, obtain a target frame image of the additional multimedia information and a size of the display interface, and crop the target frame image according to the size to obtain the cover for the additional multimedia information.

13. The electronic device of claim 9, the at least one memory further storing instructions that upon execution by the at least one processor cause the electronic device to:
switch, in response to the sliding operation to the main multimedia information, the main multimedia information displayed on the display interface into information which is not the to-be-displayed multimedia information.

14. The electronic device of claim 9, wherein the to-be-displayed multimedia information further comprises account information of a publisher of the multimedia information;
the at least one memory further storing instructions that upon execution by the at least one processor cause the electronic device to:
establish a third graph layer, adding the account information of the publisher of the multimedia information to the third graph layer, and loading the third graph layer to the display interface, wherein the account information has no background color, the third graph layer is located above the first graph layer, and the account information of the publisher of the multimedia information does not overlap with the cover for the at least one piece of additional multimedia information in the display interface.

15. The electronic device of claim 14, the at least one memory further storing instructions that upon execution by the at least one processor cause the electronic device to:
send a request for obtaining home page information of the publisher of the multimedia information to a server in response to a clicking operation to the account information; and
receive the home page information of the publisher of the multimedia information, switching the multimedia information in the first graph layer into the home page information to obtain an updated first graph layer, and loading the updated first graph layer to the display interface.

16. A computer readable non-transitory storage medium storing non-transitory computer instructions, wherein the non-transitory computer readable instructions, when executed by a computer, cause the computer to
obtain multimedia information that comprises main multimedia information and at least one piece of additional multimedia information having an association relationship with the main multimedia information, the main multimedia information and the additional multimedia information being advertisements;
display the main multimedia information on a display interface;
acquire a cover for the at least one piece of additional multimedia information when the main multimedia information is displayed for a preset time period, and displaying the main multimedia information and the cover on the display interface, wherein the cover displays the at least one piece of additional multimedia information; and
switch, in response to a clicking operation on the cover, the main multimedia information displayed on the display interface to the additional multimedia information corresponding to the clicking operation, and displaying the additional multimedia information on the display interface along with the cover, wherein the cover further comprises a first additional multimedia information and a second additional multimedia information and display order information of the first additional multimedia information and the second additional multimedia information;

acquire, in response to a sliding operation for the additional multimedia information after the switch, a to-be-displayed multimedia information according to a sliding direction indicated by the sliding operation and the display order information of the additional multimedia information, wherein the to-be-displayed multimedia information is the first additional multimedia information when the sliding direction is in a first direction, and the to-be-displayed multimedia information is the second additional multimedia information when the sliding direction is in a second direction, wherein a logic relationship between the sliding direction and the to-be-displayed multimedia information is set in advance; and switch the additional multimedia information displayed on the display interface to the to-be-displayed multimedia information.

* * * * *